United States Patent [19]
Milliren et al.

[11] Patent Number: 5,874,485
[45] Date of Patent: Feb. 23, 1999

[54] FLEXIBLE FOAMS AND FLEXIBLE MOLDED FOAMS BASED ON ALLOPHANATE-MODIFIED DIPHENYLMETHANE DIISOCYANATES AND PROCESSES FOR THE PRODUCTION OF THESE FOAMS

[75] Inventors: Charles M. Milliren; Sanjeev Madan, both of Coraopolis, Pa.; William E. Slack, Moundsville, W. Va.; Ronald Zibert, Burgettstown; Richard A. Riccitelli, Monaca, both of Pa.; William E. Miller, St. Clairsville, Ohio

[73] Assignee: Bayer Corporation, Pittsburgh, Pa.

[21] Appl. No.: 966,818

[22] Filed: Nov. 10, 1997

[51] Int. Cl.$^6$ .................................................. C08G 18/10
[52] U.S. Cl. ..................... 521/160; 521/164; 521/167; 521/174; 521/175; 521/176
[58] Field of Search ..................................... 521/160, 164, 521/167, 174, 175, 176

[56] References Cited

U.S. PATENT DOCUMENTS

| | | | |
|---|---|---|---|
| 4,239,856 | 12/1980 | Rowton | 521/118 |
| 4,256,849 | 3/1981 | Ick et al. | 521/129 |
| 4,261,852 | 4/1981 | Carroll et al. | 528/59 |
| 4,365,025 | 12/1982 | Murch et al. | 521/159 |
| 4,478,960 | 10/1984 | Buethe et al. | 521/160 |
| 4,738,991 | 4/1988 | Narayan | 521/124 |
| 4,833,176 | 5/1989 | Wolf et al. | 521/160 |
| 4,866,103 | 9/1989 | Cassidy et al. | 521/159 |
| 4,876,292 | 10/1989 | Milliren | 521/159 |
| 4,945,117 | 7/1990 | Gansen et al. | 521/99 |
| 5,070,114 | 12/1991 | Watts et al. | 521/159 |
| 5,319,053 | 6/1994 | Slack et al. | 528/48 |
| 5,319,054 | 6/1994 | Slack et al. | 528/48 |
| 5,369,138 | 11/1994 | Gensen | 521/159 |
| 5,521,225 | 5/1996 | Gerber et al. | 521/155 |
| 5,521,226 | 5/1996 | Bleys | 521/174 |

FOREIGN PATENT DOCUMENTS

| | | |
|---|---|---|
| 0022617 | 1/1981 | European Pat. Off. . |
| 0031650 | 7/1981 | European Pat. Off. . |
| 0393903 | 10/1990 | European Pat. Off. . |
| 994890 | 6/1965 | United Kingdom . |

*Primary Examiner*—Rachel Gorr
*Attorney, Agent, or Firm*—Joseph C. Gil; N. Denise Brown

[57] ABSTRACT

This invention relates to flexible foams and flexible molded foams prepared from an isocyanate component comprising an allophanate-modified diphenylmethane diisocyanate. The present invention also relates to processes for the production of these flexible foams and flexible molded foams.

26 Claims, No Drawings

FLEXIBLE FOAMS AND FLEXIBLE MOLDED FOAMS BASED ON ALLOPHANATE-MODIFIED DIPHENYLMETHANE DIISOCYANATES AND PROCESSES FOR THE PRODUCTION OF THESE FOAMS

BACKGROUND OF THE INVENTION

This invention relates to flexible foams and flexible molded foams prepared from an isocyanate component comprising an allophanate-modified diphenylmethane diisocyanate. The present invention also relates to processes for the production of these flexible foams and flexible molded foams.

Flexible polyurethane foams and processes for their preparation are known and are described in, for example, U.S. Pat. Nos. 4,478,960, 4,833,176, 4,876,292, 4,945,117, 5,070,114, 5,369,138, 5,521,225 and 5,521,226, and in European Patents 0010850 and 0022617. Mixtures of diphenylmethane diisocyanate (MDI), poly(phenylmethane isocyanate), prepolymers based on such materials, and toluene diisocyanate are known to be suitable for preparing flexible foams. See, for example, U.S. Pat. Nos. 4,239,856, 4,256,849, 4,261,852 and 4,365,025.

U.S. Pat. No. 5,070,114 discloses the preparation of flexible foams prepared from diphenylmethane diisocyanate (MDI) based prepolymers having a rather low NCO value and from an isocyanate-reactive composition comprising relatively high amounts of water.

U.S. Pat. No. 4,478,960 describes the preparation of flexible polyurethane from 1) a prepolymer based on MDI and optionally polymeric MDI, and a polyol having from 5 to 30% by wt. of oxyethylene groups, wherein the prepolymer has an NCO group content of 12 to 30% by wt., 2) polymeric MDI, if 1) above is MDI, 3) a polyol having a low EO content and 4) a blowing agent.

A process for the preparation of a flexible foam from a prepolymer having an NCO content of from 15 to 30% by wt. is disclosed by U.S. Pat. No. 4,945,117. These flexible foams are prepared from a polyol having a functionality of at least 4.

The preparation of flexible foams from polyisocyanate prepolymers is disclosed by U.S. Pat. No. 5,369,138. The prepolymer is reacted with water and a mixture of a polyol having a low oxyethylene content and a polyol having a high oxyethylene content.

U.S. Pat. No. 4,876,292 describes a particular isocyanate-reactive mixture suitable for preparing flexible polyurethane foams. This mixture comprises up to 3 parts by wt. of an amine corresponding to a specific formula, up to 30% by wt. of a polyoxyalkylene polyamine having a molecular weight of from about 400 to about 5000 and containing from 2 to 3 primary amino groups, and from 70 to 100% by wt. of one or more polyether polyhydroxyl compounds having hydroxyl functionalities of from 2 to 3 and molecular weights of from 1000 to 10,000. Polymethylene poly(phenyl isocyanates) or prepolymers thereof are suitable for reaction with these isocyanate-reactive mixtures.

The process for producing flexible foams disclosed by U.S. Pat. No. 5,521,225 comprises reacting a polyisocyanate composition having an NCO group content of 10 to 25% by wt., with a specific polyol composition. Suitable polyisocyanate compositions comprise a) an isocyanate prepolymer having an NCO content of 5 to 15% by wt. and being prepared by reacting an excess of polyisocyanate and a polyol of specified functionality, equivalent weight and EO content, and b) a polyisocyanate having an NCO content of 30 to 33% by wt.

Allophanate modified isocyanates are also known in the art. Various isocyanates containing allophanate groups and processes for their production are disclosed in, for example, U.S. Pat. Nos. 4,738,991, 4,866,103, 5,319,053 and 5,319,054, European Patents 0,031,650 and 0,393,903, and GB Patent 994,890. European Patent 0,393,903 is of relevance; it discloses some examples wherein flexible foams are prepared. These flexible foams, however, are produced from an allophanate-modified isocyanate based on MDI containing 20% by weight of the 2,4'-isomer of MDI, and high molecular weight polyether polyols having a functionality of 2 to 3.

U.S. Pat. No. 4,738,991 is also of interest in that it discloses one example wherein a flexible foam is prepared. This flexible foam, however, is produced from an allophanate-modified isocyanate based on toluene diisocyanate which is prepared according to the process described therein.

European Patent 0,031,650 describes MDI based allophanate modified isocyanates. These blends, however, consist of an allophanate modified MDI which is the reaction product of an alcohol with an MDI based isocyanate comprising more than 20% by weight of the 2,4'-isomer of MDI. It also discloses that these may be suitable isocyanates for flexible foam molding.

It has presently been found that allophanate modified diphenylmethane diisocyanates can be used to produce flexible foams and flexible molded foams which exhibit excellent properties. More specifically, flexible foams and flexible molded foams produced from these allophanate modified diisocyanates exhibit increased tear strengths, tensile strengths and elongations with sharp end cure and reactivity profiles. When compared to conventional and/or commercial isocyanates which are typically used in flexible foams and flexible molded foams, these allophanate modified diphenylmethane diisocyanates result in foams having tear strengths which are 4 to 5 times higher and elongations which are 50 to 100% greater.

It was also noted that the flexible foams and flexible molded foams produced from these allophanate modified diphenylmethane diisocyanates have high compression sets. However, the improved strength properties make these foams very attractive for specialty applications including, for example, packaging, toys, specialized medical seating and archery targets.

Another advantage offered by the allophanate modified diphenylmethane diisocyanates is an increased processing window. Conventional polymeric MDI based systems have a processing window between 115° to 140° F. Below 115° F. mold temperatures, the systems are sensitive to mold temperature tending to form a "skin" on the surface and form pressure voids. Allophanate modified isocyanates extend the processing window down to at least about 100° F., with no loss in the other processing requirements. This attribute provides significant commercial advantage, offering a robust system which is less prone to problems due to mold temperature variations.

It was also found that compression sets of these foams could be lowered by blending the allophanate modified diphenylmethane diisocyanates with polymethylene poly (phenyl isocyanates), i.e., PMDI. While blending PMDI will lower compression sets, we found that the addition of an amine based alcohol crosslinker, such as, for example, diethanolamine (DEOA) further drops the compression set into the area where they would be useful as automotive flexible foams in, for example, headrests, armrests, and seating.

SUMMARY OF THE INVENTION

This invention relates to flexible foams, flexible molded foams and to processes for the production of these foams. These foams comprise the reaction product of A) an isocyanate component which comprises 1) an allophanate-group containing diisocyanate having an isocyanate group content of from about 12 to about 32.5% by weight and being prepared by reacting an aliphatic and/or aromatic alcohol with a diphenylmethane diisocyanate comprising i) from 0 to 60% by weight of 2,4'-diphenylmethane diisocyanate, ii) no more than 6% by weight of 2,2'-diphenylmethane diisocyanate, and iii) the balance being 4,4'-diphenylmethane diisocyanate, with the percentages by weight of A)1)i), A)1)ii) and A)1)iii) totalling 100%; with B) an isocyanate-reactive component, in the presence of C) a blowing agent comprising water. The isocyanate-reactive component B) comprises 1) one or more polyether polyhydroxyl compounds having hydroxyl functionalities of from about 1.5 to 6, and molecular weights of from about 1,000 to about 10,000, and 2) one or more organic compounds having molecular weights of from 90 to less than 1,000, and containing from 2 to 4 isocyanate-reactive groups, said compound being selected from the group consisting of polyols, amines, aminoalcohols and mixtures thereof. In the present invention, the amounts of components A), B) and C) are such that the isocyanate index is from 60 to 120.

In a preferred embodiment of the present invention, the flexible foams and flexible molded foams comprise the reaction product of A) an isocyanate component comprising 1) from 10 to 90% by weight, based on 100% by weight of A)1) and A)2), of an allophanate-modified diphenylmethane diisocyanate as described above, and 2) from 10 to 90% by weight, based on 100% by weight of A)1) and A)2), of an isocyanate which comprises: i) from 0 to 60% by weight of 2,4'-diphenylmethane diisocyanate, ii) no more than 6% by weight of 2,2'-diphenylmethane diisocyanate, iii) from 30 to 100% by weight of 4,4'-diphenylmethane diisocyanate, and iv) from 0 to 60% by weight of higher functional isocyanates of the diphenylmethane series, wherein the percentages by weight of A)2)i), A)2)ii), A)2)iii) and A)2)iv) total 100% by weight. In this particular embodiment, component B) the isocyanate-reactive component, comprises 1) one or more polyether polyhydroxyl compounds having hydroxyl functionalities of from about 1.5 to 6, and molecular weights of from about 1,000 to about 10,000; 2) one or more organic compounds having molecular weights of from 90 to less than 1,000, and containing from 2 to 4 isocyanate-reactive groups, said compound being selected from the group consisting of polyols, amines, aminoalcohols and mixtures thereof; and 3) one or more polyoxyalkylene polyamines having molecular weights of from about 1,000 to about 7,000 and containing from about 2 to about 3 primary amine groups.

The present invention also relates to a process for the production of flexible foams and to a process for the production of flexible molded foams wherein the isocyanate component comprises an allophanate modified diphenylmethane diisocyanate as described above. More specifically, these processes comprise reacting the isocyanate component A), with the isocyanate-reactive component B), in the presence of C) the blowing agent.

DETAILED DESCRIPTION OF THE INVENTION

Suitable isocyanates to be used as component A) in the present invention include 1) allophanate-group containing diisocyanates having an isocyanate group content of from about 12 to about 32.5% (preferably about 19 to about 30%, most preferably 21 to 29%) by weight. These are prepared by reacting an aliphatic alcohol and/or an aromatic alcohol, with a diphenylmethane diisocyanate which comprises: i) from 0 to 60% (preferably no more than 14, more preferably no more than 2%) by weight of 2,4'-diphenylmethane diisocyanate, ii) no more than 6% (preferably no more than 2%) by weight of 2,2'-diphenylmethane diisocyanate, and iii) the balance being 4,4'-diphenylmethane diisocyanate, with the %'s by weight of A)1)i), A)1)ii) and A)1)iii) totalling 100% by weight. These allophanate-modified diisocyanates are described in U.S. Pat. No. 5,319,053, the disclosure of which is herein incorporated by reference. It is preferred that these allophanate modified diisocyanates are prepared from aliphatic and/or aromatic alcohols having 8 carbon atoms or less.

It is also possible for the isocyanate component A) to comprise A)1) 10 to 90% by weight, preferably 15 to 85%, more preferably 30 to 70% by weight, based on 100% by weight of components A)1) and A)2), of the allophanate-modified diisocyanates as described above, and A)2) 10 to 90% by weight, preferably 15 to 85%, more preferably 30 to 70% by weight, based on 100% by weight of components A)1) and A)2), of an isocyanate which comprises: i) from 0 to 60%, preferably 10 to 24% by weight of 2,4'-diphenylmethane diisocyanate, ii) no more than 6%, preferably less than 3% by weight of 2,2'-diphenylmethane diisocyanate, iii) from 30 to 100%, preferably 34 to 65% by weight of 4,4'-diphenylmethane diisocyanate, and iv) from 0 to 60%, preferably 20 to 56% by weight of higher functional isocyanates of the diphenylmethane series, with the %'s by weight of A)2)i), A)2)ii), A)2)iii) and A)2)iv) totalling 100% by weight.

Suitable isocyanate-reactive components B) for the present invention comprise B)1) from about 70 to about 99.998% by weight, based on 100% by weight of component B), of one or more polyether polyhydroxyl compounds having hydroxyl functionalities of from about 1.5 to about 6, preferably about 1.5 to 3, and molecular weights of from about 1,000 to about 10,000, preferably about 1,000 to about 6,200; and B)2) from about 0.002% to about 30% by weight, based on 100% by weight of component B), of one or more organic compounds having molecular weights of from 90 to less than 1,000, preferably of from about 100 to about 400, and containing from 2 to 4, preferably 2 to 3 isocyanate-reactive groups, wherein said organic compounds are selected from the group consisting of polyols, amines, and aminoalcohols. It is preferred that the isocyanate-reactive component B) comprises B)1) 80 to 99.998% by weight of one or more polyether polyhydroxyl compounds, and B)2) from 0.002 to 20% by weight of one or more organic compounds.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to starter compounds containing reactive hydrogen atoms such as water, alcohols, diols, triols, etc. Examples of suitable starter compounds include, for example, propylene glycol, glycerin, ethylene glycol, triethanolamine, water, trimethylolpropane, sorbitol, pentaerythritol, bisphenol A, sucrose, ethanolamine, etc., and mixtures thereof. It is preferred to use polyethers which contain substantial amounts of primary hydroxyl groups in terminal positions (greater than 50% by weight, based on all of the terminal hydroxyl groups present in the polyether).

Mixtures of amine started polyether polyols with hydroxyl started polyether polyols are also suitable as component B)1) in the present invention. If these are used, it is preferred that these are mixtures with tri-functional polyether polyols as described above.

Polyether polyols are preferably used as component B)1) in the invention. Preferred polyethers include, for example, those compounds based on starter compounds such as, for example, water, ethylene glycol, propylene glycol, glycerin, trimethylolpropane, triethanolamine, sorbitol, and mixtures thereof. These preferred compounds include copolymers of ethylene oxide and propylene oxide.

Suitable organic compounds having molecular weights of from about 90 to less than 1,000, preferably of from 100 to 400, and containing from 2 to 4, preferably 2 to 3 isocyanate-reactive groups, and which are suitable for use as component B)2) according to the present invention, include, for example, diols, triols, tetraols, diamines, triamines, polyamines, aminoalcohols, etc. Of course, it is also possible to use a mixture of these various compounds. Ethylene oxide adducts and/or propylene oxide adducts based on these compounds are also suitable, provided that the molecular weight of the adduct satisfies the above requirements with respect to molecular weight. Suitable diols and triols include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, 2,2,4-trimethylpentane-1,3-diol, and pentaerythritol, etc. Preferred diols and triols to be used as component B)2) include, for example, 2-methyl-1,3-propanediol, trimethylolpropane, diethylene glycol, triethylene glycol, glycerine and propylene glycol, as well as propylene oxide adducts and ethylene oxide/propylene oxide adducts of these diols and triols.

Some examples of suitable aminoalcohols to be used as component B)2) in the present invention include compounds such as, for example, monoethanolamine, diethanolamine, triethanolamine, diisopropanolamine, aminoethylethanolamine, etc., and ethylene oxide adducts and/or propylene oxide adducts of aminoalcohols, provided that these adducts satisfy the above requirements with respect to molecular weight and functionality. Preferred aminoalcohols are monoethanolamine, diethanolamine, and triethanolamine, and ethylene oxide and/or propylene oxide adducts of these aminoalcohols which satisfy the molecular weight and functionality requirements set forth above with respect to this component.

Suitable amine compounds to be used for component B)2) in accordance with the present invention include, for example, organic primary amines and/or secondary amines having from 2 to 4 amine groups, preferably 2 to 3 amine groups, and which satisfy the molecular weight requirements as set forth above. Some examples of these compounds include 2-methyl-1,5-pentane diamine (Dytek A or MPMD), ethylene diamine, 1,3-diaminopropane, 1,4-diaminobutane, isophoronediamine, diethylenetriamine, diaminocyclohexane, hexamethylenediamine methyliminobispropylamine, iminobispropylamine, bis (aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof, and the like. Ethylene oxide adducts and/or propylene oxide adducts of these amine compounds are also suitable for use as component B)2) provided that the above requirements for functionality and molecular weight are satisfied.

Other suitable amines include, for example, aromatic polyamines, including diamines, having molecular weights of 90 to less than 1,000, preferably of from 100 to 400. These aromatic diamines include, for example, 1-methyl-3, 5-diethyl-2,4-diamino benzene, 1-methyl-3,5-diethyl-2,6-diamino benzene, 1,3,5-trimethyl-2,4-diamino benzene, 1,3, 5-triethyl-2,4-diamino benzene, 3,5,3',5'-tetraethyl-4,4'-diamino diphenylmethane, 3,5,3',5'-tetraisopropyl4,4'-diamino diphenylmethane, 3,5-diethyl-3',5'-diisopropyl-4, 4'-diamino diphenylmethane, 3,5-diethyl-5,5'-diisopropyl4, 4'-diamino diphenylmethane, 1-methyl-2,6-diamino-3-isopropylbenzene, dimetaxylene diamine and mixtures of the above diamines, such as, for example, mixtures of 1-methyl-3,5-diethyl-2,4-diamino benzene and 1-methyl-3, 5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4, 4',4"-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable.

It is also possible to use the so-called amine-terminated polyethers having low molecular weights. Among the suitable amine terminated polyethers include, for example, those containing primary or secondary (preferably primary) aromatically or aliphatically (preferably aliphatically) bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

These low molecular weight amine-terminated polyethers can be prepared by any of several methods known in the art. For example, amine-terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551, 605. French Patent No. 1,466,708 discloses the preparation of polyethers containing secondary amine end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups and are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, 4,931,595 and 5,283,364.

The amine terminated polyethers used in the present invention are in many cases mixtures with any of the above-mentioned compounds.

Preferred amine compounds to be used as component B)2) are 2-methyl-1,5-pentanediamine (Dytek A or MPMD), metaxylene diamine, 1,3,5-triethyl-2,4-diamino benzene, 1-methyl-3,5-diethyl-2,4-diamino benzene, 1-methyl-3,5-diethyl-2,6-diamino benzene, and mixtures thereof.

In the embodiment of the present invention where the allophanate modified isocyanate component is blended with polymeric MDI, it is essential that component B) additionally comprises B)3) one or more amine-terminated polyethers having molecular weights of from greater than about 1,000 up to about 7,000, preferably about 4,000 to about 6,000, and a functionality of from about 2 to about 4, preferably from about 2 to about 3.

In this embodiment, component B) the isocyanate-reactive component comprises B)1) from 70 to 99.5%, preferably 80 to 90% by weight, based on 100% by weight of component B), of one or more polyether polyhydroxyl compounds having a molecular weight of from about 1,000 to about 10,000, B)2) from 0 to 5%, preferably 0.25 to 4%, more preferably 0.5 to 4% by weight, based on 100% by weight of component B), of one or more organic compounds selected from the group consisting of polyols, amines, and aminoalcohols, having a molecular weight of from about 90 to less than 1,000, and B)3) from 0.5 to 30%, preferably 1 to 15% by weight, based on 100% by weight of component B), of one or more amine-terminated polyethers.

Suitable amine-terminated polyethers to be used as component B)3) according to the invention include, for example, polymers containing aromatically bound isocyanate-reactive primary or secondary (preferably primary) amino groups and/or aliphatically bound isocyanate-reactive primary or secondary amino groups and having a molecular weight of from greater than about 1,000 up to about 7,000, preferably about 4,000 to about 6,000, and most preferably about 4,000 to 5,000. Suitable amine-terminated polyethers contain about 2 to about 4, preferably about 2 to about 3, and more preferably 3 amino groups. Mixtures of higher functional ones with lower functional ones can be used to assure that the average functionality of the blend is less than about 4. Compounds containing amino end groups can also be attached to the polymer chain through urethane or ester groups. The preferred liquid amine-terminated polymers are liquids at room temperature and have viscosities of less than about 20,000 mPa.s at 25° C. Although solid or higher-viscosity liquid amine-terminated polymers are not themselves suitable, mixtures of amine-terminated polymers containing one or more solid and/or higher-viscosity liquid amine-terminated polymers may be suitable if the mixtures are liquids having appropriate viscosities.

Suitable amine-terminated polyethers can be prepared by any of several methods known in the art. Since most of these methods use hydroxyl-functional polyethers as starting materials, the reactions do not necessarily have to be taken to completion in order to provide amine-terminated polyethers of the present invention, i.e., polyethers having at least two isocyanate reactive groups and a molecular weight of from about 1,000 to about 7,000 in which at least 50% of the isocyanate reactive groups are primary and/or secondary amino groups.

Particularly preferred liquid amine-terminated polymers are amine-terminated polyethers that contain primary amino groups attached to the polyether on an aliphatic hydrocarbon residue. These amine-terminated polyethers are commercially available from the Huntsman Corporation of Houston, Tex. under the trademark Jeffamine®. These include compounds such as, for example, Jeffamine D-2000, Jeffamine D-4000, Jeffamine T-3000 and Jeffamine T-5000. These amine-terminated polyethers are prepared from polyhydroxypolyethers (e.g., polypropylene glycol ethers) by reaction with ammonia in the presence of hydrogen and catalysts as described in, for example, U.S. Pat. No. 3,654,370, the disclosure of which is herein incorporated by reference, or by hydrogenation of cyanoethylated polyoxypropylene ethers as described in, for example German Patent 1,193,671 and U.S. Pat. No. 3,267,050, the disclosures of which are herein incorporated by reference. Other methods for the preparation of polyoxyalkylene polyamines are described in U.S. Pat. Nos. 3,155,728 and 3,236,895 and French Patent 1,551,605.

Suitable amine-terminated polyethers can be obtained by the hydrolysis of various polymers containing isocyanate and other end groups. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. Suitable amine-terminated polyethers can be prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,4,578,5, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506, 039, 4,525,590, 4,532,266, 4,532,317, 4,723,032, 4,724,252, 4,855,504, and 4,931,595, the disclosures of which are herein incorporated by reference. Relatively high molecular weight compounds containing amino end groups may also be obtained according to U.S. Pat. No. 3,865,791 (believed to correspond to German Offenlegungsschrift 2,546,536) or U.S. Pat. No. 3,865,791, the disclosures of which are herein incorporated by reference, by reacting isocyanate prepolymers based on polyhydroxy polyethers with hydroxyl-containing enamines, aldimines, or ketimines and hydrolyzing the reaction products.

Other suitable amine-terminated polyethers include aminophenoxy-substituted polyethers described, for example, in European Patent Applications 288,825 and 268,849. Aminophenoxy-substituted polyethers can also be prepared, for example, by converting polyether polyols into nitrophenoxy-terminated polyethers (by reaction, for example, with chloronitrobenzenes), followed by hydrogenation. E.g., U.S. Pat. Nos. 5,079,225 and 5,091,582. In a preferred method, aminophenoxy-substituted polyethers are prepared by converting polyether polyols into the corresponding sulfonate derivatives, followed by reaction of the polyether sulfonate with an aminophenoxide.

Suitable amine-terminated polyethers also include aliphatic amine-terminated polyethers prepared by the mesylate method described, for example, in U.S. application Ser. No. 07/957,929 (filed Oct. 7, 1992). In a preferred method, polyether polyols are converted into corresponding derivatives having suitable leaving groups (such as halide or sulfonate groups) that in turn react with primary amines to form secondary amine-terminated polyethers.

Other suitable amine-terminated polyethers include aminobenzoic acid esters of polyether polyols described, for example, in U.S. Pat. No. 5,219,973. These aminobenzoate derivatives are prepared by reaction of polyether polyols with metanitrobenzoic acid or, preferably, metanitrobenzoyl chloride to form corresponding nitrobenzoic acid esters that are then hydrogenated to the amines.

Although generally less preferred, suitable amine-terminated polyethers also include certain aminocrotonate-terminated derivatives of polyethers prepared from acetoacetate-modified polyethers as described, for example, in U.S. Pat. Nos. 5,066,824, 5,151,470, and 5,231,217.

Suitable blowing agents for the present invention comprise water. In addition, it is also possible that water may be used in conjunction with other blowing agents such as, for example, pentane, acetone, cyclopentane, cyclohexane, partially or completely fluorinated hydrocarbons, methylene chloride and liquid carbon dioxide. It is preferred that water is used as the sole blowing agent.

When water is used as the sole blowing agents, it is typically used in the present invention in quantities of between about 0.05 to 10%, preferably between about 0.05 to 9%, more preferably between about 0.35 to 7%, and most preferably between about 0.35 and 5% by weight, based on 100% by weight of the polyol-side (B-side) of the formulation. Of course, as described above, water may be used in combination with other blowing agents. The above ranges for water as a sole blowing agent are exceeded when mixtures of water and another blowing agent are used in the present invention. Blowing agent mixtures of this type are required to be present in quantities which are typical of a conventional process for producing a flexible foam and/or a flexible molded foam.

Catalysts are also required to be present in the reaction mixture according to the present invention. Suitable catalysts include, for example, tertiary amine catalysts and organometallic catalysts.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl) tin bis(isooctylmercaptoacetate), all of which are commercially available from Witco Chemical Corp., are especially preferred. The use of a delayed action catalyst such as an iron pentanedione or a bismuth carboxylate, as described in U.S. Pat. No. 4,611,044, herein incorporated by reference, is also possible.

Suitable heat-activated catalysts for the present invention are amine salts. These catalysts include aliphatic and aromatic tertiary amines. Suitable heat-activated amine salts include compounds such as, for example, DABCO 8154 commercially available from Air Products, a formic acid blocked 1,4-diaza-bicyclo[2.2.0]octane, and other delayed action catalysts such as DABCO WT, also commercially available from Air Products; and Polycat SA-1, Polycat SA-102 and Polycat 610/50 which are acid-blocked versions of 1,8-diazabicyclo[5.4.0]undecene-7 (i.e., Polycat DBU) and commercially available from Air Products. Trialkyl amines and heterocyclic amines are also suitable for the present invention. Suitable compounds include, for example, trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, triethylene diamine, tetramethyl-1,3-butanediamine, N,N,N',N'-tetramethylethylenediamine, N,N,N',N'-tetramethylhexane-diamine-1,6,N,N,N',N',N''-pentamethyldiethylenetriamine, bis(2-dimethylaminoethoxy)-methane, N,N,N'-trimethyl-N'-(2-hydroxyethylethyldiamine, N,N-dimethyl-N',N'-(2-hydroxyethyl)-ethylenediamine, tetramethylguanidine, N-methylpiperidine, N-ethylpiperidine, N-methylmorpholine, N-ethylmorpholine, 1,4-dimethyl-piperidine, 1,2,4-trimethylpiperidine, N-(2-dimethylaminoethyl)-morpholine, 1-methyl-4-(2-dimethylamino)-piperidine, 1,4-diazabicyclo-[2.2.2]octane, 2-methyl-1,4-diazabicyclo[2.2.2]octane quinuclidine, 1,5-diazabicyclo[5.4.0]-5-undecene, and 1,5-diazabicyclo[4.3.0]-5-nonane.

Organometallic catalysts are usually used in amounts ranging from about 0.005 to about 0.8%, preferably about 0.05 to 0.5%, more preferably about 0.02 to 0.4% by weight, based on 100% by weight of the polyol-side (B-side) of the formulation. Tertiary amine catalysts, or salts thereof, are advantageously used in amounts ranging from about 0.05 to about 4%, preferably about 0.1 to about 3.5%, more preferably about 0.2 to 2% by weight, based on 100% by weight of the polyol-side (B-side) of the formulation. It is preferred that the total quantity of all catalysts be such that they comprise less than 5% by weight, preferably less than 2% by weight of 100% by weight of the polyol-side (B-side) of the formulation.

It is also possible that various additives and/or auxiliary agents may be included in the formulation. Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

In addition to the surface-active agents, other additives which may be used in the molding compositions of the present invention include known internal mold release agents, pigments, cell regulators, flame retarding agents, plasticizers, dyes, fillers and reinforcing agents such as glass in the form of fibers or flakes or carbon fibers.

The compositions according to the present invention may be molded using conventional processing techniques at isocyanate indexes ranging from about 60 to 120 (preferably from 70 to 115). By the term "Isocyanate Index" (also commonly referred to as "NCO index"), is defined herein as the equivalents of isocyanate, divided by the total equivalents of isocyanate-reactive hydrogen containing materials, multiplied by 100.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples of the present invention.

ISO A
an allophanate modified diisocyanate based on diphenylmethane diisocyanate having an NCO group content of 23% by weight, and a viscosity of about 410 cps at 25° C. This isocyanate was prepared by reacting 92.8 parts by weight (pbw) of an isomeric mixture comprising 98% by wt. of 4,4'-MDI and 2% by wt. of 2,4'-MDI, with 7.2 pbw of 1-butanol at 60° C., followed by adding 0.0075 pbw of zinc acetylacetonate (ZnAcAc) catalyst to the resulting urethane, increasing the temperature to 90° C. and holding it there for about 1.5 hours in order to form the allophanate. The catalyst in the resultant product was neutralized by adding 0.015 pbw of benzoyl chloride, followed by cooling to 25° C.

ISO B
an allophanate modified diisocyanate based on diphenylmethane diisocyanate having an NCO group content of about 27% by weight, and having a viscosity of about 82 cps at 25° C. This isocyanate was prepared by reacting 95.6 parts by weight (pbw) of an isomeric mixture comprising 98% by wt. of 4,4'-MDI and 2% by wt. of 2,4'-MDI, with 4.4 pbw of 1-butanol at 60° C., followed by adding 0.0075 pbw of ZnAcAc catalyst to the resulting urethane, increasing the temperature to 90° C. in order to form the allophanate. The catalyst in the resultant product was neutralized by adding 0.015 pbw of benzoyl chloride, followed by cooling to 25° C.

ISO C
an isomeric mixture of diphenylmethane diisocyanate containing about 33.6% NCO and having a functionality of 2. The isomer distribution was as follows: 51% by weight of 2,4'-MDI, 47.5% by weight of 4,4'-MDI and 1.5% by weight of 2,2'-MDI.

ISO D
a blend of an allophanate-modified diisocyanate based on diphenylmethane diisocyanate with ISO C, the blend having an NCO group content of about 23% by weight, a functionality of 2.0, and having a viscosity of about 490 cps at 25° C. This diisocyanate contained 47% by weight allophanate modified MDI, 42% by weight of 4,4'-MDI, 10.7% by weight of 2,4'-MDI and 0.3% by weight of 2,2'-MDI.

This isocyanate was prepared by mixing:
i) 81 pbw of an allophanate-modified diisocyanate having an NCO group content of about 20.5% by weight which is the reaction product of 100 (pbw) of 98% by wt. 4,4'-MDI and 2% by wt. of 2,4'-MDI, with 9.9 pbw of 1-butanol at 60° C., followed by adding 0.0082 pbw of ZnAcAc catalyst to the resulting urethane, increasing the temperature to 90° C., and holding at this temperature for 1.5 hours to form the allophanate. The catalyst in the resultant product was neutralized by adding 0.017 pbw of benzoyl chloride, followed by cooling to 25° C.; with ii) 19 pbw of ISO C.

ISO E
an allophanate-modified diisocyanate based on MDI and ISO C, having a functionality of about 2 and an NCO group content of about 23%, and having a viscosity of about 440 at 25° C. This diisocyanate contained 50% by weight of allophanate modified MDI, 42.0% by weight of 4,4'-MDI, 7.8% by weight of 2,4'-MDI and 0.2% by weight of 2,2'-MDI.

This isocyanate was prepared by blending 81.1 pbw of 4,4'-MDI with 18.9 pbw of ISO C, followed by adding 7.7 pbw of 1-butanol at 60° C. After the exotherm of the urethane reaction was completed, 0.0081 pbw of ZnAcAc catalyst was added, the reaction temperature was increased to 90° C. and held at 90° C. for 1.5 hours to form the allophanate. The catalyst in the resultant allophanate product was neutralized by adding 0.016 pbw of benzoyl chloride, following by cooling to 25° C.

ISO F
a polymeric polymethylene polyisocyanate having an NCO group content of about 32.5% by weight, a functionality of about 2.2, having a total monomer content of about 74% by weight, wherein about 52% is the 4,4'-isomer, about 19% is the 2,4'-isomer and about 3% is the 2,2'-isomer; and about 26% by weight of higher molecular weight homologues of the MDI series.

ISO G
a polymethylene poly(phenylisocyanate) having an NCO group content of about 32.3% by weight, a functionality of about 2.4, and a total monomer content of about 64% by weight which consists of about 45% by weight of the 4,4'-isomer, about 17% by weight of the 2,4'-isomer and about 2% by weight of the 2,2'-isomer, and contains about 36% by weight of higher molecular weight homologues of the MDI series.

ISO H
   a polymethylene poly(phenylisocyanate) having an NCO group content of about 32.8% by weight, a functionality of about 2.2, and a total monomer content of about 78% by weight which consisted of about 55% by weight of the 4,4'-isomer, about 20% by weight of the 2,4'-isomer and about 3% by weight of the 2,2'-isomer, and contains about 22% by weight of higher molecular weight homologues of the MDI series.

ISO I
   an isocyanate blend prepared from 57.4 pbw of ISO A with 42.6 pbw of ISO G. This blend had an NCO group content of about 27% and a functionality of about 2.2. The total monomer content of this blend was about 56% by weight, with the balance being higher molecular weight homologues of the MDI series and allophanate modified MDI. The monomer content consisted of 47.3% by weight of 4,4'-MDI, about 1% by weight of 2,2'-MDI and about 7.7% by weight of 2,4'-MDI. The amount of allophanate modified MDI was about 28.7%.

ISO J
   an isocyanate blend prepared from 71.6 pbw of ISO A with 28.4 pbw of ISO G. This blend had an NCO group content of about 25.6% and a functionality of about 2.1. The total monomer content of this blend was about 54% by weight, with the balance being higher molecular weight homologues of the MDI series and allophanate modified MDI. The monomer content consisted of 47.9% by weight of 4,4'-MDI, less than 1% by weight of 2,2'-MDI and about 5.5% by weight of 2,4'-MDI. The amount of allophanate modified MDI was about 35.8%.

ISO K
   an isocyanate blend prepared from 63.6 pbw of ISO A with 36.4 pbw of ISO C. This blend had an NCO group content of about 26.9% and a functionality of about 2.0. The total monomer content of this blend was about 68.2% by weight.
   The monomer content consisted of 48.5% by weight of 4,4'-MDI, about 1% by weight of 2,2'-MDI and about 19% by weight of 2,4'-MDI. The amount of allophanate modified MDI was about 31.8%.

ISO L
   an isocyanate blend prepared from 16.8 pbw of ISO B with 83.2 pbw of ISO C. This blend had an NCO group content of about 32.5% and a functionality of about 2.0. The total monomer content of this blend was about 94.5% by weight.
   The monomer content consisted of 50.6% by weight of 4,4'-MDI, about 1% by weight of 2,2'-MDI and about 42.6% by weight of 2,4'-MDI. The amount of allophanate modified MDI was about 5.5%.

Polyol A
   a polyether triol having an OH number of about 28, and being prepared from glycerine, propylene oxide and ethylene oxide, the weight ratio of PO to EO being about 87:13.

Polyol B
   a polyether having an OH number of about 100 and a functionality of about 6, and being prepared from sorbitol, propylene oxide and ethylene oxide, the weight ratio of PO to EO being about 17.8:82.8.

Polyol C
   a polyether polyol having an OH number of about 28 and a functionality of about 2, and being prepared from propylene glycol, propylene oxide and ethylene oxide, the weight ratio of PO to EO being about 87:13.

Polyol D
   a polyether polyol having an OH number of 37 and a functionality of about 3, and being prepared from glycerine, ethylene oxide (62.7% by wt.), followed by a mixture of propylene oxide and ethylene oxide (27.3% and 10.0% by wt., respectively).

Amine A
   2-methyl-1,5-pentanediamine; a chain extender which is commercially available from DuPont as Dytek A.

Amine B
   diethanolamine, a crosslinker having a molecular weight of about 105.

ATPE A
   an amine terminated polyether triamine having a molecular weight of about 5000 and a functionality of about 3; commercially available as Jeffamine T-5000 from Huntsman Corporation.

ATPE B
   an amine terminated polyether diamine having a molecular weight of about 4000 and a functionality of about 2; commercially available as Jeffamine D4000 from Huntsman Corporation.

CAT A
   a tertiary amine containing catalyst comprising 33% triethylene diamine in dipropylene glycol, commercially available from Air Products Inc. as Dabco 33LV.

CAT B
   70% bis(dimethylaminoethyl)ether and 30% dipropylene glycol; a catalyst commercially available from OSi-Witco Corp. as NIAX A-1.

CAT C
   a tertiary amine catalyst blend; commercially available from OSi-Witco Corp. as NIAX A4.

CAT D
   a catalyst comprising a mixture of tertiary amines and dipropylene glycol; commercially available from Rhein Chemie as RC6410.

CAT E
   a water soluble tin catalyst; commercially available from Rhein Chemie as PS-209.

ADD 1
   a commercially available silicone surfactant

The polyol formulation set forth in Table 1 was used in Examples 1–5 of the present invention.

TABLE 1

| Components | Polyol Blend 1 |
| --- | --- |
| Polyol A | 100 |
| Polyol B | 2.00 |
| Amine A | 0.50 |
| CAT A | 0.18 |
| CAT B | 0.25 |
| CAT C | 0.45 |
| ADD 1 | 0.50 |
| water | 3.00 |

In the examples, the components of the B-side were accurately weighed into a suitable container and mixed using an air driven two-blade mixer or a three-blade mixer. The resultant mixture was then taken to the metering equipment. The metering equipment was flushed with the mixture and calibrated for the desired foam index.

The mixture was mixed with the isocyanate using high pressure metering equipment (HENNECKE HK 100) and a Hennecke MQ-12-2 self-cleaning mixhead. Process settings were as follows:

| | |
|---|---|
| TEMPERATURE B-side: | 77–95° F. |
| TEMPERATURE ISO: | 77–100° F. |
| MIX PRESSURES B-side/ISO: | 1000–2500 psi |
| MOLD TEMPERATURE (°F.): | 100–150° F. |
| MOLD RELEASE: | Permamold 2023SP |
| DEMOLD TIME: | 3–7 mins. |

The reaction mixture was metered into a 15 inch×15 inch×4 inch mold (which had been previously sprayed with the mold release agent) in an amount sufficient to give the desired foam density. The mold was then closed and the foam part demolded after the reaction was complete. The parts were labelled and tested for physical properties. The parts were aged under standard ASTM conditions (50% RH, 72°–74° F.) for three days. The parts were then tested under ASTM 3574.

The results obtained were as reported in the following tables.

TABLE 2

| Example | 1 | 2 | 3 |
|---|---|---|---|
| Polyol Blend | 1 | 1 | 1 |
| Isocyanate | ISO A | ISO B | ISO F |
| Isocyanate Index | 95 | 95 | 100 |
| RESULTS | | | |
| Molded Density (kg/m³) | 57.7 | 56.1 | 54.5 |
| Core Density (kg/m³) | 55.3 | 52.9 | 54.5 |
| Tensile Strength (MPa) | 0.24 | NA* | 0.12 |
| Elongation (%) | 155 | NA* | 95 |
| Tear Strength (N/M) | 875.6 | NA* | 175.1 |
| Compression Set (%) | 33 | NA* | 4 |
| ILD 25% (kg) | 30.9 | NA* | 25.9 |

*results not available

TABLE 3

| EXAMPLES | 4 | 5 |
|---|---|---|
| Polyol Blend | 1 | 1 |
| Isocyanate | ISO D | ISO E |
| Isocyanate Index | 95 | 95 |
| RESULTS | | |
| Molded Density (kg/m³) | 56.1 | 56.1 |
| Core Density (kg/m³) | 52.9 | 56.1 |
| Tensile Strength (MPa) | 0.19 | 0.19 |
| Elongation (%) | 166 | 154 |
| Tear Strength (N/M) | 788.0 | 700.5 |
| Compression Set (%) | 42 | 42 |
| ILD 25% (kg) | 25.5 | 24.1 |

Examples 6–11 were prepared using the process settings set forth above. The formulations used in these examples are set forth in Tables 4 and 5.

TABLE 4

Examples 6–9 used the following formulations:

| | Ex. 6 | Ex. 7 | Ex. 8 | Ex. 9 |
|---|---|---|---|---|
| Polyol A | 61.1 | 61.1 | 61.1 | 61.1 |
| Polyol C | 30.0 | 30.0 | 30.0 | 30.0 |
| ATPE A | 8.5 | 8.9 | 8.9 | 8.9 |
| ATPE B | 0 | 0 | 0 | 0 |
| Amine B | 0 | 0 | 1.5 | 0 |
| Amine A | 0.425 | 0.44 | 0 | 0.44 |
| ADD 1 | 1.5 | 1.5 | 1.5 | 1.5 |
| Polyol B | 2.0 | 2.0 | 2.0 | 2.0 |
| water | 3.4 | 3.55 | 3.55 | 3.55 |
| Cat D | 0.2 | 0.2 | 0.3 | 0.3 |
| Cat E | 0 | 0 | 0 | 0 |
| Cat B | 0.2 | 0.14 | 0.07 | 0.08 |
| Cat A | 0.1 | 0.56 | 0.28 | 0.62 |
| ISO | I | I | K | L |
| % by wt. monomer | 85 | 90 | 100 | 100 |
| ISO Index | 95 | 95 | 95 | 95 |

TABLE 5

Formulations for Examples 10 and 11

| | Ex. 10 | Ex. 11 |
|---|---|---|
| Polyol A | 30 | 40 |
| Polyol C | 60 | 50 |
| ATPE A | 10 | 0 |
| ATPE B | 0 | 10 |
| Amine A | 0.5 | 0.5 |
| ADD 1 | 1.5 | 1.5 |
| Polyol B | 1.0 | 1.0 |
| Polyol D | 1.0 | 1.0 |
| water | 4.0 | 4.0 |
| Cat D | 0.35 | 0.35 |
| Cat E | 0.35 | 0.35 |
| Cat B | 0.2 | 0.2 |
| Cat A | 0 | 0 |
| ISO | F | F |
| % by wt. monomer | 75 | 75 |
| ISO Index | 95 | 95 |

The reaction mixtures in Examples 6–11 were each metered into a 15 inch×15 inch×4 inch mold (which had been previously sprayed with the mold release agent) in an amount sufficient to give the desired foam density. The mold was then closed and the foam part demolded after the reaction was complete. The parts were labelled and tested for physical properties. The parts were aged under standard ASTM conditions (50% RH, 72°–74° F.) for three days. The parts were then tested under ASTM 3574.

TABLE 6

Physical Properties for Examples 6–11

| | Ex. 6 | Ex. 7 | Ex. 8 | Ex. 9 | Ex. 10 | Ex. 11 |
|---|---|---|---|---|---|---|
| Molded Density (kg/m³) | 50 | 50 | 51 | 45 | 38 | 38 |
| Tensile Strength KPa) | 198 | 198 | 214 | 211 | 123 | 139 |
| Elongation (%) | 132 | 139 | 133 | 227 | 140 | 137 |
| Tear Strength (N/M) | 900 | 1010 | 970 | 1080 | 540 | 600 |

TABLE 6-continued

Physical Properties for Examples 6–11

|  | Ex. 6 | Ex. 7 | Ex. 8 | Ex. 9 | Ex. 10 | Ex. 11 |
|---|---|---|---|---|---|---|
| Compression Set (50%) | 11.5 | 13.7 | 11.5 | 11.5 | 8.4 | 9.2 |
| SAG (kg) | 3.09 | 3.18 | 3.05 | 3.19 | 2.56 | 2.53 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flexible foam comprising the reaction product of:
   A) an isocyanate component comprising:
      1) an allophanate-group containing diisocyanate having an isocyanate group content of from about 12 to about 32.5% by weight and being prepared by reacting an aliphatic and/or aromatic alcohol with a diphenylmethane diisocyanate comprising:
         i) from 0 to 60% by weight of 2,4'-diphenylmethane diisocyanate,
         ii) no more than 6% by weight of 2,2'-diphenylmethane diisocyanate, and
         iii) the balance being 4,4'-diphenylmethane diisocyanate, with the %'s by weight of A)1)i), A)1)ii) and A)1)iii) totalling 100%, with
   B) an isocyanate-reactive component comprising:
      1) from about 70 to about 99.998% by weight, based on 100% by weight of component B), of one or more polyether polyhydroxyl compounds having hydroxyl functionalities of from about 1.5 to 6, and molecular weights of from about 1,000 to about 10,000, and
      2) from about 0.002 to about 30% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, in the presence of
   C) a blowing agent comprising water, and
   D) at least one catalyst,
with the amounts of components A), B) and C) being such that the isocyanate index is from 60 to 120.

2. The flexible foam of claim 1, wherein A)1) said allophanate-group containing diisocyanate has an isocyanate group content of from about 19 to 30% by weight, and is prepared by reacting an aliphatic and/or aromatic alcohol having 8 carbon atoms or less with a diphenylmethane diisocyanate comprising:
   i) no more than 14% by weight of 2,4'-diphenylmethane diisocyanate,
   ii) no more than 2% by weight of 2,2'-diphenylmethane diisocyanate, and
   iii) the balance being 4,4'-diphenylmethane diisocyanate, with the %'s by weight of A)1)i), A)1)ii) and A)1)iii) totalling 100%.

3. The flexible foam of claim 1, wherein B) said isocyanate-reactive component comprises:
   1) from about 80 to about 99.998% by weight, based on 100% by weight of component B), of one or more polyether polyhydroxyl compounds having hydroxyl functionalities of from about 1.5 to 3, and molecular weights of from about 1,000 to about 6,200, and
   2) from about 0.002 to about 20% by weight, based on 100% by weight of component B), of one or more organic compounds having molecular weights of from about 100 to about 400, and containing from 2 to 3 isocyanate-reactive groups, said compound being selected from the group consisting of polyols, amines, aminoalcohols and mixtures thereof.

4. The flexible foam of claim 3, wherein said B)1) comprises a polyether polyol based on an initiator selected from the group consisting of water, ethylene glycol, propylene glycol, glycerin, trimethylolpropane, triethanolamine, sorbitol, and mixtures thereof.

5. The flexible foam of claim 3, wherein said B)2) is selected from the group consisting of 2-methyl-1,3-propanediol, trimethylolpropane, diethylene glycol, triethylene glycol, glycerine, propylene glycol, monoethanolamine, diethanolamine, triethanolamine, 2-methyl-1,5-pentane diamine, metaxylene diamine, 1,3,5-triethyl-2,4-diamino benzene, 1-methyl-3,5-diethyl-2,4-diamino benzene, 1-methyl-3,5-diethyl-2,6-diamino benzene, mixtures thereof, and ethylene oxide and/or propylene oxide adducts thereof.

6. A flexible foam comprising the reaction product of:
   A) an isocyanate component has an isocyanate group content of from about 13.6 to 33.5% by weight, and comprises:
      1) from about 10 to about 90% by weight, based on 100% by weight of A)1) and A)2), of an allophanate-group containing diisocyanate having an isocyanate group content of from about 12 to about 32.5% by weight and being prepared by reacting an aliphatic and/or aromatic alcohol with a diphenylmethane diisocyanate comprising:
         i) from 0 to 60% by weight of 2,4'-diphenylmethane diisocyanate,
         ii) no more than 6% by weight of 2,2'-diphenylmethane diisocyanate, and
         iii) the balance being 4,4'-diphenylmethane diisocyanate, with the %'s by weight of A)1)i), A)1)ii) and A)1)iii) totalling 100% by weight, and
      2) from about 10 to about 90% by weight based on 100% by weight of A)1) and A)2), of an isocyanate comprising:
         i) from 0 to 60% by weight of 2,4'-diphenylmethane diisocyanate,
         ii) no more than 6% by weight of 2,2'-diphenylmethane diisocyanate,
         iii) from 30 to 100% by weight of 4,4'-diphenylmethane diisocyanate, and
         iv) from 0 to 60% by weight of higher functional isocyanates of the diphenylmethane series, with the %'s by weight of A)2)i), A)2)ii), A)2)iii) and A)2)iv) totalling 100% by weight, and,
   B) said isocyanate-reactive component comprises:
      1) from about 70 to about 99.5% by weight, based on 100% by weight of component B), of one or more polyether polyhydroxyl compounds having hydroxyl functionalities of from about 1.5 to 6, and molecular weights of from about 1,000 to about 10,000,
      2) from about 0 to about 5% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, and 3) from 0.5 to about 30% by weight, based on 100% by weight of component B), of one or more polyoxyalkylene polyamines having molecular weights of from about 1,000 to about 7,000 and containing from about 2 to about 4 primary amine groups, in the presence of C) a blowing agent comprising water, and D) at least one catalyst, with the amounts of components A), B) and C) being such that the isocyanate index is from 70 to 110.

7. The flexible foam of claim 6, wherein A) said isocyanate component has an isocyanate group content of from about 13.6 to 33.5% by weight, and comprises:

1) from about 15 to about 85% by weight, based on 100% by weight of A)1) and A)2), of an allophanate-group containing diisocyanate having an isocyanate group content of from about 19 to about 30% by weight and being prepared by reacting an aliphatic and/or aromatic alcohol with a diphenylmethane diisocyanate comprising:
   i) no more than 14% by weight of 2,4'-diphenylmethane diisocyanate,
   ii) no more than 2% by weight of 2,2'-diphenylmethane diisocyanate, and
   iii) the balance being 4,4'-diphenylmethane diisocyanate, with the %'s by weight of A)1)i), A)1)ii) and A)1)iii) totalling 100% by weight, and 2) from about 15 to about 85% by weight based on 100% by weight of A)1) and A)2), of an isocyanate comprising:
   i) from 10 to 24% by weight of 2,4'-diphenylmethane diisocyanate,
   ii) no more than 3% by weight of 2,2'-diphenylmethane diisocyanate,
   iii) from 34 to 65% by weight of 4,4'-diphenylmethane diisocyanate, and
   iv) from 20 to 56% by weight of higher functional isocyanates of the diphenylmethane series, with the %'s by weight of A)2)i), A)2)ii), A)2)iii) and A)2)iv) totalling 100% by weight.

8. The flexible foam of claim 6, wherein B) said isocyanate-reactive component comprises:

1) from about 80 to about 90% by weight, based on 100% by weight of component B), of one or more polyether polyhydroxyl compounds having hydroxyl functionalities of from about 1.5 to 3, and molecular weights of from about 1,000 to about 6,200, 2) from about 0.25 to about 4% by weight, based on 100% by weight of component B), of one or more organic compounds having molecular weights of from 100 to 400, and containing from 2 to 3 isocyanate-reactive groups, said compound being selected from the group consisting of polyols, amines, aminoalcohols and mixtures thereof, and 3) from 1 to about 15% by weight, based on 100% by weight of component B), of one or more polyoxyalkylene polyamines having molecular weights of from about 4,000 to about 6,000 and containing from about 2 to about 3 primary amine groups.

9. The flexible foam of claim 8, wherein said B)1) comprises a polyether polyol based on an initiator selected from the group consisting of water, ethylene glycol, propylene glycol, glycerin, trimethylolpropane, triethanolamine, sorbitol, and mixtures thereof.

10. The flexible foam of claim 8, wherein said B)2) is selected from the group consisting of 2-methyl-1,3-propanediol, trimethylolpropane, diethylene glycol, triethylene glycol, glycerine, propylene glycol, monoethanolamine, diethanolamine, triethanolamine, 2-methyl-1,5-pentane diamine, metaxylene diamine, 1,3,5-triethyl-2,4-diamino benzene, 1-methyl-3,5-diethyl-2,4-diamino benzene, 1-methyl-3,5-diethyl-2,6-diamino benzene, mixtures thereof, and ethylene oxide and/or propylene oxide adducts thereof.

11. The flexible foam of claim 8, wherein said B)3) comprises an amine-terminated polyether having about 3 amino groups, and has a viscosity of less than about 20,000 mPa.s at 25° C.

12. A flexible molded foam comprising the reaction product of:

A) an isocyanate component comprising:
  1) an allophanate-group containing diisocyanate having an isocyanate group content of from about 12 to about 32.5% by weight and being prepared by reacting an aliphatic and/or aromatic alcohol with a diphenylmethane diisocyanate comprising:
    i) from 0 to 60% by weight of 2,4'-diphenylmethane diisocyanate,
    ii) no more than 6% by weight of 2,2'-diphenylmethane diisocyanate, and
    iii) the balance being 4,4'-diphenylmethane diisocyanate, with the %'s by weight of A)1)i), A)1)ii) and A)1)iii) totalling 100%, with B) an isocyanate-reactive component comprising:
  1) from about 70 to about 99.998% by weight, based on 100% by weight of component B), of one or more polyether polyhydroxyl compounds having hydroxyl functionalities of from about 1.5 to 6, and molecular weights of from about 1,000 to about 10,000, and
  2) from about 0.002 to about 30% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, in the presence of C) a blowing agent comprising water, and D) at least one catalyst, with the amounts of components A), B) and C) being such that the isocyanate index is from 60 to 120.

13. The flexible molded foam of claim 12, wherein A)1) said allophanate-group containing diisocyanate has an isocyanate group content of from about 19 to 30% by weight, and is prepared by reacting an aliphatic and/or aromatic alcohol having 8 carbon atoms or less with a diphenylmethane diisocyanate comprising:
  i) no more than 14% by weight of 2,4'-diphenylmethane diisocyanate,
  ii) no more than 2% by weight of 2,2'-diphenylmethane diisocyanate, and
  iii) the balance being 4,4'-diphenylmethane diisocyanate, with the %'s by weight of A)1)i), A)1)ii) and A)1)iii) totalling 100%.

14. The flexible molded foam of claim 12, wherein B) said isocyanate-reactive component comprises:

1) from about 80 to about 99.998% by weight, based on 100% by weight of component B), of one or more polyether polyhydroxyl compounds having hydroxyl functionalities of from about 1.5 to 3, and molecular weights of from about 1,000 to about 6,200, and 2) from about 0.002 to about 20% by weight, based on 100% by weight of component B), of one or more organic compounds having molecular weights of from about 100 to about 400, and containing from 2 to 3 isocyanate-reactive groups, said compound being selected from the group consisting of polyols, amines, aminoalcohols and mixtures thereof.

15. The flexible molded foam of claim 14, wherein said B)1) comprises a polyether polyol based on an initiator selected from the group consisting of water, ethylene glycol, propylene glycol, glycerin, trimethylolpropane, triethanolamine, sorbitol, and mixtures thereof.

16. The flexible molded foam of claim 14, wherein said B)2) is selected from the group consisting of 2-methyl-1,3-propanediol, trimethylolpropane, diethylene glycol, triethylene glycol, glycerine, propylene glycol, monoethanolamine, diethanolamine, triethanolamine, 2-methyl-1,5-pentane diamine, metaxylene diamine, 1,3,5-triethyl-2,4-diamino benzene, 1-methyl-3,5-diethyl-2,4-diamino benzene, 1-methyl-3,5-diethyl-2,6-diamino benzene, mixtures thereof, and ethylene oxide and/or propylene oxide adducts thereof.

17. A flexible molded foam comprising the reaction product of:
   A) an isocyanate component has an isocyanate group content of from about 13.6 to 33.5% by weight, and comprises:
      1) from about 10 to about 90% by weight, based on 100% by weight of A)1) and A)2), of an allophanate-group containing diisocyanate having an isocyanate group content of from about 12 to about 32.5% by weight and being prepared by reacting an aliphatic and/or aromatic alcohol with a diphenylmethane diisocyanate comprising:
         i) from 0 to 60% by weight of 2,4'-diphenylmethane diisocyanate,
         ii) no more than 6% by weight of 2,2'-diphenylmethane diisocyanate, and
         iii) the balance being 4,4'-diphenylmethane diisocyanate, with the %'s by weight of A)1)i), A)1)ii) and A)1)iii) totalling 100% by weight, and
      2) from about 10 to about 90% by weight based on 100% by weight of A)1) and A)2), of an isocyanate comprising:
         i) from 0 to 60% by weight of 2,4'-diphenylmethane diisocyanate,
         ii) no more than 6% by weight of 2,2'-diphenylmethane diisocyanate,
         iii) from 30 to 100% by weight of 4,4'-diphenylmethane diisocyanate, and
         iv) from 0 to 60% by weight of higher functional isocyanates of the diphenylmethane series, with the %'s by weight of A)2)i), A)2)ii), A)2)iii) and A)2)iv) totalling 100% by weight, and,
   B) said isocyanate-reactive component comprises:
      1) from about 70 to about 99.5% by weight, based on 100% by weight of component B), of one or more polyether polyhydroxyl compounds having hydroxyl functionalities of from about 1.5 to 6, and molecular weights of from about 1,000 to about 10,000,
      2) from about 0 to about 5% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, and
      3) from 0.5 to about 30% by weight, based on 100% by weight of component B), of one or more polyoxyalkylene polyamines having molecular weights of from about 1,000 to about 7,000 and containing from about 2 to about 4 primary amine groups, in the presence of
   C) a blowing agent comprising water, and
   D) at least one catalyst, with the amounts of components A), B) and C) being such that the isocyanate index is from 70 to 110.

18. The flexible molded foam of claim 17, wherein A) said isocyanate component has an isocyanate group content of from about 13.6 to 33.5% by weight, and comprises:
   1) from about 15 to about 85% by weight, based on 100% by weight of A)1) and A)2), of an allophanate-group containing diisocyanate having an isocyanate group content of from about 19 to about 30% by weight and being prepared by reacting an aliphatic and/or aromatic alcohol with a diphenylmethane diisocyanate comprising:
      i) no more than 14% by weight of 2,4'-diphenylmethane diisocyanate,
      ii) no more than 2% by weight of 2,2'-diphenylmethane diisocyanate, and
      iii) the balance being 4,4'-diphenylmethane diisocyanate, with the %'s by weight of A)1)i), A)1)ii) and A)1)iii) totalling 100% by weight, and
   2) from about 15 to about 85% by weight based on 100% by weight of A)1) and A)2), of an isocyanate comprising:
      i) from 10 to 24% by weight of 2,4'-diphenylmethane diisocyanate,
      ii) no more than 3% by weight of 2,2'-diphenylmethane diisocyanate,
      iii) from 34 to 65% by weight of 4,4'-diphenylmethane diisocyanate, and
      iv) from 20 to 56% by weight of higher functional isocyanates of the diphenylmethane series, with the %'s by weight of A)2)i), A)2)ii), A)2)iii) and A)2)iv) totalling 100% by weight.

19. The flexible foam of claim 17, wherein B) said isocyanate-reactive component comprises:
   1) from about 80 to about 90% by weight, based on 100% by weight of component B), of one or more polyether polyhydroxyl compounds having hydroxyl functionalities of from about 1.5 to 3, and molecular weights of from about 1,000 to about 6,200,
   2) from about 0.25 to about 4% by weight, based on 100% by weight of component B), of one or more organic compounds having molecular weights of from 100 to 400, and containing from 2 to 3 isocyanate-reactive groups, said compound being selected from the group consisting of polyols, amines, aminoalcohols and mixtures thereof, and
   3) from 1 to about 15% by weight, based on 100% by weight of component B), of one or more polyoxyalkylene polyamines having molecular weights of from about 4,000 to about 6,000 and containing from about 2 to about 3 primary amine groups.

20. The flexible molded foam of claim 19, wherein said B)1) comprises a polyether polyol based on an initiator selected from the group consisting of water, ethylene glycol, propylene glycol, glycerin, trimethylolpropane, triethanolamine, sorbitol, and mixtures thereof.

21. The flexible molded foam of claim 19, wherein said B)2) is selected from the group consisting of 2-methyl-1,3- propanediol, trimethylolpropane, diethylene glycol, triethylene glycol, glycerine, propylene glycol, monoethanolamine, diethanolamine, triethanolamine, 2-methyl-1,5-pentane diamine, metaxylene diamine, 1,3,5-triethyl-2,4-diamino benzene, 1-methyl-3,5-diethyl-2,4-diamino benzene, 1-methyl-3,5-diethyl-2,6-diamino benzene, mixtures thereof, and ethylene oxide and/or propylene oxide adducts thereof.

22. The flexible foam of claim 19, wherein said B)3) comprises an amine-terminated polyether having about 3 amino groups, and has a viscosity of less than about 20,000 mPa.s at 25° C.

23. A process for the production of a flexible foam comprising reacting:
   A) an isocyanate component comprising:
      1) an allophanate-group containing diisocyanate having an isocyanate group content of from about 12 to about 32.5% by weight and being prepared by reacting an aliphatic and/or aromatic alcohol with a diphenylmethane diisocyanate comprising:
         i) from 0 to 60% by weight of 2,4'-diphenylmethane diisocyanate,
         ii) no more than 6% by weight of 2,2'-diphenylmethane diisocyanate, and
         iii) the balance being 4,4'-diphenylmethane diisocyanate, with the %'s by weight of A)1)i), A)1)ii) and A)1)iii) totalling 100%, with
   B) an isocyanate-reactive component comprising:
      1) from about 70 to about 99.998% by weight, based on 100% by weight of component B), of one or more polyether polyhydroxyl compounds having hydroxyl functionalities of from about 1.5 to 6, and molecular weights of from about 1,000 to about 10,000, and
      2) from about 0.002 to about 30% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, in the presence of
   C) a blowing agent comprising water, and
   D) at least one catalyst, with the amounts of components A), B) and C) being such that the isocyanate index is from 60 to 120.

24. A process for the production of a flexible foam comprising reacting:
   A) an isocyanate component has an isocyanate group content of from about 13.6 to 33.5% by weight, and comprises:
      1) from about 10 to about 90% by weight, based on 100% by weight of A)1) and A)2), of an allophanate-group containing diisocyanate having an isocyanate group content of from about 12 to about 32.5% by weight and being prepared by reacting an aliphatic and/or aromatic alcohol with a diphenylmethane diisocyanate comprising:
         i) from 0 to 60% by weight of 2,4'-diphenylmethane diisocyanate,
         ii) no more than 6% by weight of 2,2'-diphenylmethane diisocyanate, and
         iii) the balance being 4,4'-diphenylmethane diisocyanate, with the %'s by weight of A)1)i), A)1)ii) and A)1)iii) totalling 100% by weight, and
      2) from about 10 to about 90% by weight based on 100% by weight of A)1) and A)2), of an isocyanate comprising:
         i) from 0 to 60% by weight of 2,4'-diphenylmethane diisocyanate,
         ii) no more than 6% by weight of 2,2'-diphenylmethane diisocyanate,
         iii) from 30 to 100% by weight of 4,4'-diphenylmethane diisocyanate, and
         iv) from 0 to 60% by weight of higher functional isocyanates of the diphenylmethane series, with the %'s by weight of A)2)i), A)2)ii), A)2)iii) and A)2)iv) totalling 100% by weight, and,
   B) said isocyanate-reactive component comprises:
      1) from about 70 to about 99.5% by weight, based on 100% by weight of component B), of one or more polyether polyhydroxyl compounds having hydroxyl functionalities of from about 1.5 to 6, and molecular weights of from about 1,000 to about 10,000,
      2) from about 0 to about 5% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, and
      3) from 0.5 to about 30% by weight, based on 100% by weight of component B), of one or more polyoxyalkylene polyamines having molecular weights of from about 1,000 to about 7,000 and containing from about 2 to about 4 primary amine groups, in the presence of
   C) a blowing agent comprising water, and
   D) at least one catalyst, with the amounts of components A), B) and C) being such that the isocyanate index is from 70 to 110.

25. A process for the production of a flexible molded foam comprising reacting:
   A) an isocyanate component comprising:
      1) an allophanate-group containing diisocyanate having an isocyanate group content of from about 12 to about 32.5% by weight and being prepared by reacting an aliphatic and/or aromatic alcohol with a diphenylmethane diisocyanate comprising:
         i) from 0 to 60% by weight of 2,4'-diphenylmethane diisocyanate,
         ii) no more than 6% by weight of 2,2'-diphenylmethane diisocyanate, and
         iii) the balance being 4,4'-diphenylmethane diisocyanate, with the %'s by weight of A)1)i), A)1)ii) and A)1)iii) totalling 100%, with
   B) an isocyanate-reactive component comprising:
      1) from about 70 to about 99.998% by weight, based on 100% by weight of component B), of one or more polyether polyhydroxyl compounds having hydroxyl functionalities of from about 1.5 to 6, and molecular weights of from about 1,000 to about 10,000, and
      2) from about 0.002 to about 30% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, in the presence of
   C) a blowing agent comprising water, and
   D) at least one catalyst, with the amounts of components A), B) and C) being such that the isocyanate index is from 60 to 120.

26. A process for the production of a flexible molded foam comprising reacting:
- A) an isocyanate component has an isocyanate group content of from about 13.6 to 33.5% by weight, and comprises:
  1) from about 10 to about 90% by weight, based on 100% by weight of A)1) and A)2), of an allophanate-group containing diisocyanate having an isocyanate group content of from about 12 to about 32.5% by weight and being prepared by reacting an aliphatic and/or aromatic alcohol with a diphenylmethane diisocyanate comprising:
     i) from 0 to 60% by weight of 2,4'-diphenylmethane diisocyanate,
     ii) no more than 6% by weight of 2,2'-diphenylmethane diisocyanate, and
     iii) the balance being 4,4'-diphenylmethane diisocyanate, with the %'s by weight of A)1)i), A)1)ii) and A)1)iii) totalling 100% by weight, and
  2) from about 10 to about 90% by weight based on 100% by weight of A)1) and A)2), of an isocyanate comprising:
     i) from 0 to 60% by weight of 2,4'-diphenylmethane diisocyanate,
     ii) no more than 6% by weight of 2,2'-diphenylmethane diisocyanate,
     iii) from 30 to 100% by weight of 4,4'-diphenylmethane diisocyanate, and
     iv) from 0 to 60% by weight of higher functional isocyanates of the diphenylmethane series, with the %'s by weight of A)2)i), A)2)ii), A)2)iii) and A)2)iv) totalling 100% by weight, and,
- B) said isocyanate-reactive component comprises:
  1) from about 70 to about 99.5% by weight, based on 100% by weight of component B), of one or more polyether polyhydroxyl compounds having hydroxyl functionalities of from about 1.5 to 6, and molecular weights of from about 1,000 to about 10,000,
  2) from about 0 to about 5% by weight, based on 100% by weight of component B), of one or more organic compounds having molecular weights of from 90 to less than 1,000, and containing from 2 to 4 isocyanate-reactive groups, said compound being selected from the group consisting of polyols, amines, aminoalcohols and mixtures thereof, and
  3) from 0.5 to about 30% by weight, based on 100% by weight of component B), of one or more polyoxyalkylene polyamines having molecular weights of from about 1,000 to about 7,000 and containing from about 2 to about 4 primary amine groups, in the presence of
- C) a blowing agent comprising water, and
- D) at least one catalyst, with the amounts of components A), B) and C) being such that the isocyanate index is from 70 to 110.

* * * * *